United States Patent [19]

Rutschke et al.

[11] Patent Number: 5,934,841
[45] Date of Patent: Aug. 10, 1999

[54] ROUND BAR CUTTING TOOL AND CUTTING TOOL HEAD FOR SAME

[75] Inventors: Arno Rutschke, Zürich, Switzerland; Friedrich Dörpinghaus, Hückeswagen, Germany

[73] Assignee: Oerlikon Geartec AG, Zurich, Switzerland

[21] Appl. No.: 08/876,459

[22] Filed: Jun. 16, 1997

[30] Foreign Application Priority Data

Jun. 20, 1996 [DE] Germany ............... 196 24 685

[51] Int. Cl.⁶ .................................. B23F 21/12
[52] U.S. Cl. ............... 407/22; 407/41; 407/49; 407/20
[58] Field of Search ............... 407/22, 21, 20, 407/34, 35, 36, 41, 43, 44, 47, 49, 53, 58, 61

[56] References Cited

U.S. PATENT DOCUMENTS

| | | | |
|---|---|---|---|
| 1,836,737 | 12/1931 | Walker ........................... | 407/41 |
| 3,882,579 | 5/1975 | Peacock . | |
| 4,078,868 | 3/1978 | Erkfritz ....................... | 407/41 X |
| 4,197,038 | 4/1980 | Hipp et al. ................... | 407/22 |
| 4,260,299 | 4/1981 | Ryan et al. . | |
| 4,268,194 | 5/1981 | Bloink et al. ............... | 407/22 |
| 4,278,370 | 7/1981 | Spear . | |
| 4,575,285 | 3/1986 | Blackesley ................. | 407/22 X |
| 4,621,954 | 11/1986 | Kitchen et al. ............. | 407/22 |
| 5,146,963 | 9/1992 | Carpenter et al. ........ | 407/41 X |

FOREIGN PATENT DOCUMENTS 0 203 085  12/1986  European Pat. Off. .

OTHER PUBLICATIONS

S 25 Spiral Bevel and Hypoid Gear Cutting MachineBrochure of Oerlikon Gear, undated (admitted prior art) Photocopy of German Version of S 25 Spiralkegelrad—Verzahnmaschine Brochure of Oerlikon Gear.

*Primary Examiner*—Andrea L. Pitts
*Assistant Examiner*—Henry W. H. Tsai
*Attorney, Agent, or Firm*—Panitch Schwarze Jacobs & Nadel, P.C.

[57] ABSTRACT

A round bar cutting tool (10) and a cutter head (8) provided especially for the same are provided. The cutting tool has a shank with a generally round cross-section for being fixed by clamping means (28, 30) in a cutting tool receiving bore (12) of the cutter head (8). A substantially planar positioning surface (38) which serves as an engagement surface for the clamping means (28, 30) is located along the shank length in an extension of a cutting face (43) formed on the cutting end (40) of the round bar cutting tool (10), parallel to the longitudinal cutting tool axis. The cutting face (43) and the positioning surface (38) lie in the same plane parallel to the longitudinal cutting tool axis. The cutting face is not reground during sharpening and can therefore have a coating which increases the serviceable life of the cutting edge. The clamping means are wedging devices which press with their clamping surface against the positioning surface (38) of the round bar cutting tool (10) in the same direction as the cutting load during operation. The round bar cutting tool (10) and the cutter head (8) can be produced at low cost. The round bar cutting tool has a long service life, can be easily set up in the cutter head (8) and also maintains its set-up during operation under load.

23 Claims, 4 Drawing Sheets

ROUND BAR CUTTING TOOL AND CUTTING TOOL HEAD FOR SAME

BACKGROUND OF THE INVENTION

This invention relates to a round bar cutting tool for gear cutting and finishing operations, having a cutting end with at least two clearance faces and at least one cutting face, and with a shank having a generally round cross sectional configuration for clamping in a tool receiving bore of a cutter head by clamping means.

The invention further relates to a cutter head provided for holding such a round bar cutting tool, with a substantially disk-shaped cutter head body rotatable around a central axis. The cutter head body has at least one cutting tool receiving bore penetrating through it substantially in the direction of its thickness and serving to accommodate a round bar cutting tool. The cutter head body further has at least one clamping bore for accommodation of the clamping means. Starting from the outer periphery, the clamping bore penetrates the cutter head body in a substantially radial direction perpendicular to the cutting tool receiving bore, and intersects the cutting tool receiving bore.

Figure 5:
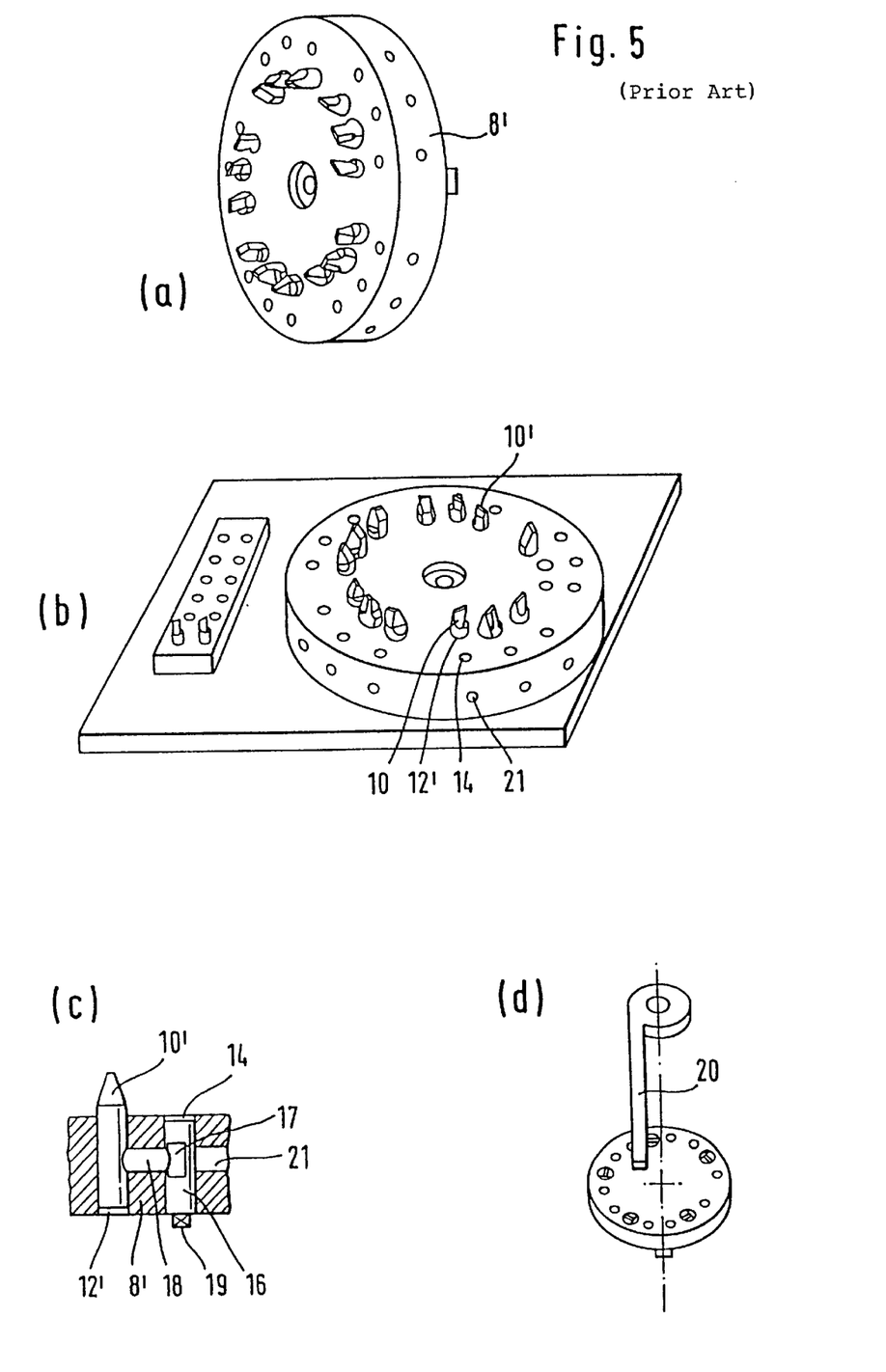
FIG. 5a is a perspective view of a cutter head in accordance with the prior art.
FIG. 5b is a perspective view of the prior art round bar cutting head of FIG. 5a in the process of being fitted with round bar cutters in accordance with the known prior art.
FIG. 5c is a cross-sectional view through the prior art cutting head of FIG. 5a showing the mounting of a round bar cutter in accordance with the prior art.
FIG. 5d illustrates a gauge used to position the round bar cutter in accordance with the prior art.

A round bar cutting tool and a cutter head of this type originate from developmental work dating back to 1968, by the company Klingelnberg Sohne in Hueckeswagen, Germany, which are represented in FIG. 5 as known prior art. Before this prior art is dealt with in greater detail, the prior art that led up to the developmental work at that time will first be discussed.

In the so-called Oerlikon method of producing bevel gears, then as now bar cutting tools with shanks of rectangular cross-sectional configuration are used. Cutter heads with axial openings or slots of correspondingly rectangular cross-sectional configuration are provided for use with the bar cutting tools. One example of a bevel gear cutting machine of the applicant, on which sets of gears can be produced both according to the Oerlikon method and the so-called Gleason method (described below), is the SPIRO-MAT S 25, which is shown for instance in the Oerlikon company brochure S 25 Spiralkegelrad-Verzahnmaschine, OGT-S 25fD/hF. The cutter head required for the Oerlikon method is fitted with a plurality of cutting tool groups with three cutting tools each. Each group includes an outside cutter, an inside cutter and a rough cutter. Three faces must be reground on the cutting end of each Oerlikon bar cutter during sharpening. The cutters are mounted radially from the outside in slots open at the periphery of a cutter head body, with clamping or filler pieces added if necessary. A shrink ring is then placed around the cutter head body. This ring has clamping screws suitably arranged for clamping the cutting tools tight in their slots. The production of the axial peripheral slots in the cutter head body and the additionally required shrink ring with the clamping means of such a cutter head are costly and cumbersome. This was one of the reasons for the development of the round bar cutting tool and cutter head according to FIG. 5.

In the Gleason method (EP-B1 0 203 085), bar cutting tools of rectangular cross sectional configuration and with rectangular mounting surfaces are utilized, and are designed so that the rough cutter can be eliminated. A cutting tool group is therefore made up of only two bar cutters, meaning that a greater number of cutting tool groups can be provided in a cutter head. This enables faster gear cutting; however, the production of the cutter head and of the bar cutters is hardly simplified in this way. However, some simplification does arise from the fact that these known bar cutters are reground only on two faces in the direction of the shank during sharpening, so that the cutting face of these cutting tools can be provided with a coating that increases the life of the cutting tools. A coating of this type is known, for example, from U.S. Pat. No. 3,882,579.

The main problem with the cutter head comprised of a body with axial peripheral slots and of a shrink ring is especially the formation of the axial slots. The known cutter head according to FIG. 5 eliminates this problem, since round bar cutting tools can be mounted in cutting tool receiving bores which can be produced at less expense than angular slots, for example on jig boring and grinding machines. FIG. 5a shows a known round bar cutting tool cutter head 8' of this type which is fitted with five cutting tool groups, each containing three round bar cutters 10'. FIG. 5b shows this round bar cutting head cutter head 8' in the process of being fitted with the round bar cutters 10'. FIG. 5c shows a detail of the manner in which the round bar cutters 10' are mounted in the cutter head 8'. The round bar cutter 10' is inserted in an axial cutting tool bore 12'. Located in an axial bore 14 parallel thereto is an eccentric 16 that presses with its eccentric surface 17 against a circular-cylindrical clamping piece 18 that presses in turn against the circular-cylindrical shank of the round bar cutter 10.

To mount the bar cutter, first of all, the clamping piece 18 is pushed from the outside through an insertion bore 21 up to the cutting tool bore 12'. Subsequently, the eccentric 16 is inserted into the axial bore 14. The eccentric 16 has a square actuating dog 19 so that a wrench or the like can be used to rigidly clamp the clamping piece 18 to the round bar cutter 10' through the eccentric 16, thus rigidly clamping the bar cutter 10' in its axial cutter bore 12'. A gauge 20, shown in FIG. 5d, serves to position the round bar cutter 10'. The axial height of the round bar cutter 10' and the orientation of its cutting face are set with the gauge 20. The set-up of the round bar cutters 10' in this known cutter head is difficult, and the originally set orientation of the cutting face of the round bar cutter 10' can easily shift during use. As little as a corresponding load exerted on the cutting face of a round bar cutter 10' is sufficient to turn it slightly about its longitudinal axis. This can not be prevented with the cylindrical clamping piece 18, no matter how fast it is tightened. Furthermore, the round bar cutter 10' used in this known cutter head must also be reground on three faces during sharpening and, therefore, does not permit coating the cutting face to increase the serviceable life of the cutters. Moreover, cutting tool groups with three such round bar cutters 10' each must be used, thus limiting the number of round bar cutters 10' that can be accommodated in the cutter head 8'.

BRIEF SUMMARY OF THE INVENTION

The object of this invention is to design a round bar cutting tool and a cutter head especially provided for the same, of the respective types described above, so that the production of the round bar cutting tool and its set-up, as well as maintenance of a secure set-up during its use can be improved, and at the same time to create a cutter head with which a round bar cutting tool of this type can be successfully employed.

To fulfill this object a round bar cutting tool of the type given above is characterized according to the invention by a substantially planar positioning surface formed along the length of the shank in an extension of the cutting face, parallel to the longitudinal cutting tool axis, which serves as the engagement surface for the clamping means.

Furthermore, to fulfill this object a cutter head of the type mentioned above is characterized according to the invention in that the clamping means has at least one wedging device with a clamping surface arranged at a specific wedge angle and capable of being urged against the positioning surface of the round bar cutting tool to clamp it in the cutting tool receiving bore.

With its substantially planar positioning surface formed in the extension of the cutting face, the round bar cutting tool according to the invention provides an engagement surface for the clamping means. This engagement surface permits the round bar cutting tool to be positively clamped in its cutting tool receiving bore in the cutter head to ensure the orientation of the cutting face during use, and in particular also simplifies the orientation process itself. Since the cutting face necessarily has a fixed orientation on the round bar cutting tool in relation to the positioning surface, clamping the round bar cutting tool in the cutting tool receiving bore simultaneously orients the cutting face. For this reason, the use of a corresponding gauge and the work that goes with it can be eliminated or at least reduced. Since the positioning surface lies in the extension of the cutting face, in the round bar cutting tool according to the invention it is possible to secure the cutting tool in the receiving bore so that the securing force acts in the same direction as the main component of the processing force during operation. In this manner the set-up of the round bar cutting tool during use is guaranteed.

With the use of a wedging device with a clamping surface serving as clamping means in the cutter head according to the invention, the orientation of the cutting face can be set in a simple manner with the specific wedge angle. At the same time the round bar cutting tool can be mounted in the cutting tool receiving bore in a particularly simple and secure manner, since the cutter is pressed by the clamping means against the surface against which it is also pressed when a load is exerted on it during operation. In the prior art described in the above mentioned Oerlikon company brochure and in the above mentioned EP-B1 0 203 085, the cutter heads do not offer this advantage, since the cutting faces therein lie substantially in a radial plane and the clamping means act in a direction parallel to this plane, whereas according to the invention the clamping direction is substantially at right angles to this plane.

Advantageous embodiments of the invention constitute the subject matter of the claims.

In a further embodiment of the round bar cutting tool according to the invention the cutting face slopes toward the positioning surface in the longitudinal direction of the shank. In this case, the cutting end of the round bar cutting tool according to the invention can be designed like a known round bar cutter in which three faces are reground in the shank direction during sharpening. Apart from this, however, all advantages of the round bar cutter according to the invention are maintained here which arise from using a substantially planar positioning surface as a clamping surface when the round bar cutting tool is mounted in a cutter head with cylindrical cutting tool receiving bores.

In a further embodiment of the round bar cutting tool according to the invention the cutting face and the positioning surface lie in one and the same plane parallel to the longitudinal axis. In this case, the positioning surface formed primarily for securing the round bar cutter can be used as the cutting face, with all the advantages provided by a cutter in which two faces are reground in the direction of the shank during sharpening.

In a further embodiment of the round bar cutting tool according to the invention, viewed in the cross section of the shank, the positioning surface is arranged so that a desired cutting or rake angle is formed. In this case, if a corresponding wedge angle is selected, the orientation of the cutting face can be determined at the same time as that of the clamping surface, provided that—as in the aforementioned further embodiment of the cutter head according to the invention—the cutting face and the positioning surface lie in one and the same plane parallel to the longitudinal cutting tool axis.

In a further embodiment of the round bar cutting tool according to the invention, the cutting face is in mirror-image arrangement depending upon whether the round bar cutting tool is used as an outside or as an inside cutter. In this case, an outside or an inside cutter can thus be simply formed from the same round bar stock used as starting material, by placing the rake angle accordingly.

In a further embodiment of the round bar cutting tool according to the invention the cutting face has a coating that increases the serviceable life of the cutter. This permits especially good exploitation of the advantage provided by the further embodiment of the round bar cutting tool according to the invention in which the cutting face and the positioning surface lie in one and the same plane parallel to the longitudinal cutting tool axis.

In a further embodiment of the round bar cutting tool according to the invention the cutting face is a main cutting face in or adjacent to which at least one secondary cutting face is additionally formed. In this case, the round bar cutting tool according to the invention can be utilized in groups of two cutting tools, one serving as an outside cutter and one as an inside cutter, with a rough cutter having been eliminated. In this way a correspondingly greater number of round bar cutters can be accommodated in a cutter head while all of the above mentioned advantages of the round bar cutting tool according to the invention and of the cutter head according to the invention are maintained. Of course it is already known per se to provide a main and a secondary cutting face in the cutting surface of bar cutters to create a secondary cutting edge in addition to the main cutting edge of the bar cutter and to avoid regrinding the cutting face itself (EP-B1 0 203 085, U.S. Pat. No. 4,260,299, U.S. Pat. No. 4,278,370). However, this is only in connection with angular bar cutting tools and not with round bar cutting tools.

In a further embodiment of the cutter head according to the invention each cutting tool receiving bore is associated with a pair of parallel clamping bores in superposed relation to one another in the thickness of the cutter head, and each clamping bore contains an identical suitable wedging device. This enables the round bar cutting tool to be even more securely clamped in the cutter head.

In a further embodiment of the cutter head according to the invention having at least two round bar cutters serving respectively as outside and inside cutters, the cutting tool bores of the two round bar cutters are at different radial distances from the center axis of the cutter head body, each wedging device of one of the two round bar cutters has a traction wedge with a wedge angle tapering towards the outer periphery of the cutter head body, and each wedging device of the other round bar cutter has a thrust wedge with a wedge angle tapering toward the center axis of the cutter head body. In this case, not only is it possible to achieve a simple and rigid as well as securely maintainable hold and orientation of the round bar cutter in the cutter head, but it is also possible for the outside and the inside cutters to be distributed extremely close to one another about the periphery of the cutter head, whereby a greatest possible number of cutting tool groups can be accommodated in the cutter head. This advantage would not be attainable if only wedging devices with traction wedges or only wedging devices with thrust wedges were utilized.

In a further embodiment of the cutter head according to the invention the traction wedge is provided with a threaded shank at its radially outer end, on which a nut can be screwed against a shoulder encompassing the clamping bore at the outer periphery of the cutter head body. In this case, the round bar cutting tool can be fixed in a simple manner by tightening the nut accordingly. The orientation of the positioning surface and thus of the cutting face can be simply set when the clamping bore is in the given position, by selecting a specific wedge angle.

In a further embodiment of the cutter head according to the invention the clamping bore associated with the thrust wedge is provided with a female thread in its radially outer area and receives a threaded pin rotatably connected at its radially inner end to the thrust wedge. In this case, the same advantages result as in the further embodiment of the invention described above, with the sole difference that in lieu of a nut a threaded pin must be tightened like a screw, for which purpose the threaded pin can be provided at its outer end with a bore having a hexagonal shape for application of a hex key.

In a further embodiment of the cutter head according to the invention the rotary connection between the threaded pin and the thrust wedge is a threaded connection. This enables the tension wedge to be more easily tightened and loosened.

In a further embodiment of the cutter head according to the invention the threaded connection between the thrust wedge and the threaded pin has a different pitch direction than the threaded connection between the threaded pin and the female thread. This results in a force amplification, so that when the traction wedge is loosened it is moved with a greater motion amplitude than the threaded pin. Inversely, an amplification of the clamping force results when the threaded pin is screwed in.

In a further embodiment of the cutter head according to the invention the rotary connection between the threaded pin and the thrust wedge has a hinge-like design, for which reason the threaded pin can be coupled to the wedge in a simpler manner than with the aid of a thread. However, this embodiment is better suited for larger cutter heads in which the hinge-like rotary connection can be properly dimensioned for an adequate transmission of force.

In a further embodiment of the cutter head according to the invention all wedging devices have the same wedge angle, thus facilitating the storage of the wedging devices.

In a further embodiment of the cutter head according to the invention the round bar cutting tools to be accommodated in the cutting tool receiving bores have a wedge angle that can be selected in steps. In this way, the orientation of the cutting faces of the round bar cutting tools can be adjusted in a simple manner to the material of the work piece material in which gear cutting operations are to be performed.

In a further embodiment of the cutter head according to the invention the clamping bores are each oriented so that a positioning angle is formed that positions the clamping surfaces of the wedging devices within the cutter head body. This enables the cutter head to be standardized in a simple manner, i.e. to be used with standard wedging devices.

In a further embodiment of the cutter head according to the invention the two clamping bores of each cutting tool receiving bore are in offset relationship to one another in the peripheral direction of the cutter head. In this case, a desired inclination of the round bar cutting tool in the cutter head can be set in a simple manner by adjusting the inclination to the mutual offset of the clamping bores and vice versa.

In a further embodiment of the cutter head according to the invention each cutting tool receiving bore forms an angle of inclination with the center axis of the cutter head body in the peripheral direction of the cutter head, corresponding to the offset of the clamping bores. This permits all round bar cutting tools to be simply arranged at this angle of inclination in the cutter head body.

Embodiments of the invention are described in greater detail below with reference to the drawings.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 2a shows, in a partial cross-sectional view of the cutter head, the manner in which a round bar cutting tool according to the invention is mounted as an outside cutter by means of a traction wedge and as an inside cutter by means of a thrust wedge;

FIG. 2b shows a partial side view of the cutter head corresponding to the partial view shown in FIG. 2a;

FIG. 3a shows a front view of a round bar cutting tool according to the invention which is utilized as an inside right cutter;

FIG. 3b is a side view of the round bar cutting tool shown in FIG. 3a;

FIG. 3c is a plan view of the round bar cutting tool shown in FIG. 3a;

FIG. 3d is a cross-sectional view of the round bar cutting tool of FIG. 3a taken along lines 3d—3d in FIG. 3a;

FIG. 4a shows a front view of a round bar cutting tool according to the invention which is utilized as an outside right cutter;

FIG. 4b shows a side view of the round bar cutting tool of FIG. 4a;

FIG. 4c shows a plan view of the round bar cutting tool of FIG. 4a;

FIG. 4d shows a cross-sectional view of the round bar cutting tool of FIG. 4 taken along lines 4d—4d in FIG. 4a;

DETAILED DESCRIPTION OF THE INVENTION

The same parts bear the same reference numbers in FIGS. 1–4. Parts similar to those shown in FIG. 5 representing the prior art already discussed above, also bear the same reference numbers in FIGS. 1–4, but without the apostrophe, to permit differentiation.

Figure 1:
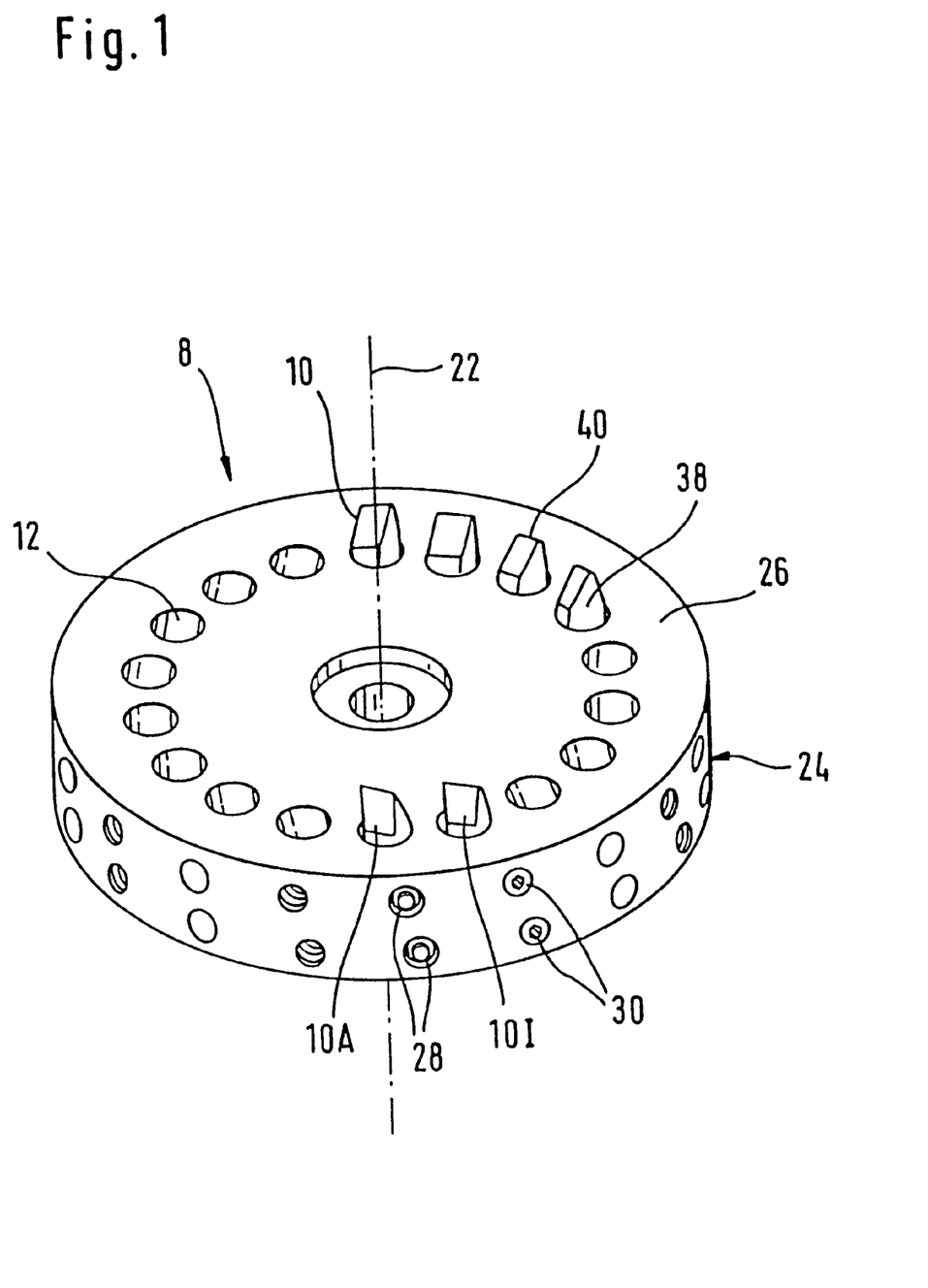
FIG. 1 shows a perspective representation of a cutter head according to the invention, with several round bar cutting tools according to the invention.

FIG. 1 shows a perspective view of a cutter head 8 with a substantially circular disk-shaped cutter head body 24 rotatable about a central or rotational axis 22. The cutter head body 24 has a plurality of cutting tool receiving bores 12 to accommodate round bar cutting tools or cutters 10. In the embodiment depicted in FIG. 1 the cutter head according to the invention has eighteen cutting tool receiving bores 12 for receiving eighteen round bar cutters 10, of which only six are shown in FIG. 1. The cutting tool receiving bores 12 extend into the cutter head body 24 substantially in the direction of its thickness. More specifically, the bores 12 are set at an angle of inclination $\delta$ from the direction of the center axis 22 of the cutter head body 24 in the peripheral direction of the cutter head body. The angle of inclination $\delta$ is shown in FIG. 2b and is preferably 12° in the embodiment shown. In the embodiment of the cutter head 8 shown in FIG. 1, all of the cutting tool receiving bores 12 are identical and are arranged in the same manner so that the round bar cutters 10 lie in a circle. The cutter head 8 is rotatably mounted about the center axis 22 in a gear cutting machine in a manner known to those skilled in the art, not shown here. The round bar cutting tools 10 protrude from an end face 26 of the cutter head body 24. Each two successive round bar cutters in a peripheral direction comprise a cutting tool group and are designed as outside and inside cutters 10A and 10I respectively. When the cutter head 8 is provided to cut gears in a two-axis process, in which one tooth slot after the other is cut individually, the round bar cutters 10 are positioned in the cutting tool receiving bores 12 differently than when the cutter head is provided to cut gears in a continuous or three-axis process in which one or more tooth slots are produced simultaneously. These processes are known and do not require further explanation here.

Each of the round bar cutting tools 10 is mounted in the cutting tool receiving bores 12 with the aid of two clamping means which, in the cutter head 8 described here, each comprise a wedging device 28 or 30. In the embodiment shown, two wedging devices 28 are allocated to each inside cutter 10I and two wedging devices 30 are allocated to each outside cutter 10A. The wedging devices 28, 30 are accommodated in clamping bores 32 and 34 respectively, which penetrate the cutter head body 24 starting from the outer periphery in a substantially radial direction perpendicular to the cutting tool receiving bores 12 and which intersect the cutting tool receiving bores 12. FIG. 2a reveals that the clamping bores 28, 30 are not radially oriented but rather are substantially radially oriented, as will be explained in greater detail below.

Each wedging device 28, 30 has a clamping surface 36 arranged at a specific wedge angle and capable of being urged against a positioning surface 38 of the round bar cutting tool 10 to clamp the cutting tool 10 in the cutting tool receiving bore 12. Every clamping bore 32 contains an identical wedging device 28, just as every clamping bore 34 contains an identical wedging device 30.

Before the structure of the wedging devices and the manner in which the round bar cutting tools 10 are clamped in the cutting tool receiving bores 12 are discussed in greater detail, the design of a round bar cutting tool will be more specifically explained with reference to FIGS. 3 and 4.

Figure 3:
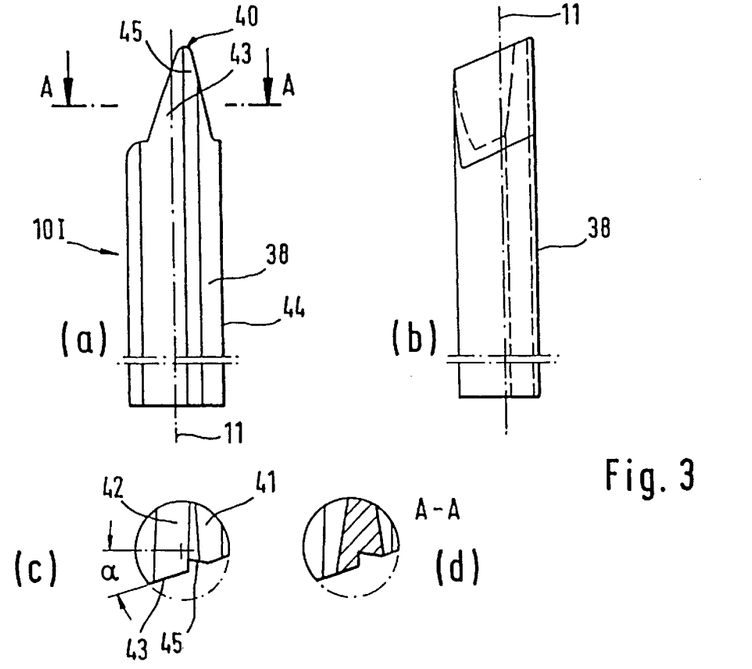

FIGS. 3a–3d depict a round bar cutting too 10I used as an inside right cutter, shown respectively as a front view, a side view, a plan view and a section at line 3d—3d in FIG. 3a. FIGS. 4a–4d depict a round bar cutting tool 10A according to the invention, that is used as an outside right cutter, shown respectively as a front view, a side view, a plan view and a section at line 4d—4d in FIG. 4a. Contrary to the cutter head 8 the round bar cutting tools for the production or processing of the tooth system of spiral bevel gears are specific to the direction of the spiral, so that different cutting tools must be used for work pieces spiraling to the left and to the right. The inside and outside cutters depicted in FIGS. 3 and 4 respectively are provided for right-spiraling tooth systems. Whenever a round bar cutter is merely designated with 10 in the present description, this applies both to an inside cutter 10I and an outside cutter 10A. For comprehension of the invention described here it is sufficient to provide a common description of the round bar cutters 10 shown in FIGS. 3 and 4, without further specifying the different designs as inside or outside cutters.

Each round bar cutter 10 has a cutting end 40 with two clearance faces 41, 42 and one cutting face 43. The round bar cutter 10 has a shank 44 with a substantially round cross section. The cutter 10 is made from bar stock of circular cross-sectional configuration in which the aforementioned surfaces including the positioning surface 38 have been ground. The positioning surface 38 is formed along the length of the shank and is an extension of the cutting face 43 and parallel to the longitudinal cutting tool axis 11, and serves as a substantially planar engagement surface for the wedging devices 28 or 30. In the preferred embodiments shown, the cutting face 43 and the positioning surface 38 lie in one and the same plane, parallel to the longitudinal cutting tool axis 11. The cutting face 43, however, could also slope towards the positioning surface 38 in the direction of the shank length, as shown in FIG. 5 for the known round bar cutter 10'.

As viewed in the cross section of the shank 44 or in the plan views in FIGS. 3c and 4c, the positioning surface 38 is placed so that a desired rake angle $\alpha$ is formed. When the round bar cutter 10 is used as an outside cutter 10A, as opposed to an inside cutter 10I, the cutting face 43 is in mirror-image arrangement, as FIGS. 4c, 4d and 3c, 3d, respectively clearly reveal. When, as in the embodiments shown, the cutting face 43 and the positioning face 38 lie in the same plane, parallel to the longitudinal cutter axis 11, and the positioning surface is thus also the cutting face, which does not require regrinding during use, as explained above, the cutting face can have a coating that increases the life of the cutting tool. A coating of this nature can be produced by metallurgical or other treatment of the cutting face using known processes for which the relevant prior art has already been given above.

The cutting face 43 is a main cutting face in the embodiment shown. However, an additional, secondary cutting face 45 may also be provided. The substantially planar design of the positioning surface as the engagement surface for the clamping means is only slightly disturbed by this. The additional cutting face can be designed and produced as given in the prior art described above or in accordance with EP-A1 0 085 176 which is incorporated herein by reference as if fully set forth. For this reason further detail is not believed to be necessary.

Figure 4:
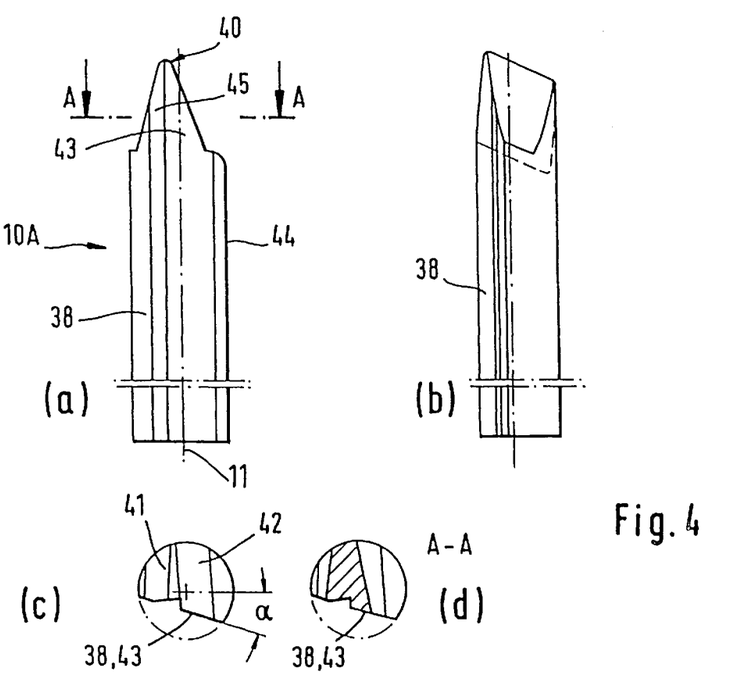

The secondary cutting face 45 is depicted in the embodiments shown in FIGS. 3 and 4 as the bottom of a groove-like depression in the main cutting face 43, with the groove being substantially rectangular. The secondary cutting face 45, however, can also be produced by forming a depression in an area spaced apart from the peripheral edge of the main cutting face 43. In this case the depression can be concave for example. This is suggested by dotted lines as depression 45' in the inside cutting tool 10I in FIG. 2a.

Reference is again made to FIGS. 2a and 2b for a description of the mounting of the round bar cutters 10 in the cutting tool receiving bores 12. In FIG. 2a it can be seen that the cutting tool receiving bores 12 of the outside cutter 10A and of the inside cutter 10I are spaced at different radial distances from the center axis 22 of the cutter head body 24, with all inside cutters 10I lying in a somewhat smaller circle than all outside cutters 10A. Furthermore, according to FIG. 2a the wedging device 28 of the outside cutter 10A has a traction wedge 37 with a wedge angle β tapering towards the outer periphery of the cutter head body 24. The wedging device 30 of each inside cutter 10I has a thrust wedge 39 with a wedge angle tapering towards the center axis 22 of the cutter head body 24 and having the same size as the wedge angle of the traction wedge 37, for which reason it is likewise labeled β. The traction wedge 37 is provided with a threaded shank 31 at its radially outer end, on which a nut 35 can be tightened against a shoulder 48 encompassing the clamping bore 32 at the outer periphery of the cutter head body 24. At the outer periphery of the cutter head body 24 the clamping bore 32 has a bore portion 50 with a larger diameter, in which the radially outer end of the threaded shank 31 and the nut 35 braced on the shoulder 48 via a washer 52 are countersunk.

The clamping bore 34 associated with the wedging device 30 is provided with a female thread 54 in its radially outer area and accommodates a headless screw 56 rotatably connected at its radially inner end to the thrust wedge 39 of the wedging device 30. In the embodiment depicted in FIG. 2a this rotary connection between the headless screw 56 and the thrust wedge 39 is a threaded connection. This threaded connection exists between a male thread of a headless screw 58 provided at the radially outer end of the thrust wedge 39 and integral with the same, and a female thread of the headless screw 56. The headless screw 56 and the headless screw 58 are thus connected to one another in the manner of a nut and bolt, wherein the headless screw 58 serves as the bolt and the headless screw 56 as the nut. Thus there are two threaded connections, one between the headless screw 56 and the female thread 54 of the clamping bore 34, and one between the headless screw 58 of the thrust wedge 39 and the female thread (not shown) of the headless screw 56. These two threaded connections have opposite pitch directions, whereby the inside cutting tool 10I can be more easily fixed in the cutting tool receiving bore 12 and the thrust wedge can be more easily slackened when the inside cutter 10I is to be loosened. For fixing the inside cutter 10I the headless screw 56 is tightened with a hex key that, engages in a hex socket (FIG. 2b) in the outer end of the headless screw 56.

The rotary connection between the headless screw 56 and the thrust wedge 39 can also have a hinge-like design. In this case a cylinder pin could be integrally formed in lieu of the headless screw 58 on the thrust wedge 39. This cylinder pin is held like a hinge pin in an inner bore of the headless screw 56; this means it is rotatable with reference to the headless screw 56 but can not be withdrawn from it.

The clamping bores 32, 34 as shown in FIG. 2a are each oriented so that a positioning angle γø is formed for positioning the clamping surfaces 36 of the wedging devices 28, 30 within the cutter head body 24. In the embodiment shown, each positioning angle γo is 20°. The wedge angle β of the wedging devices 28, 30 can be selected in steps depending on the gear cutting task to be performed. The pertinent positioning angle is then selected accordingly for positioning the clamping surfaces 36 of the wedging devices 28, 30 within the cutter head body 24.

Figure 2:
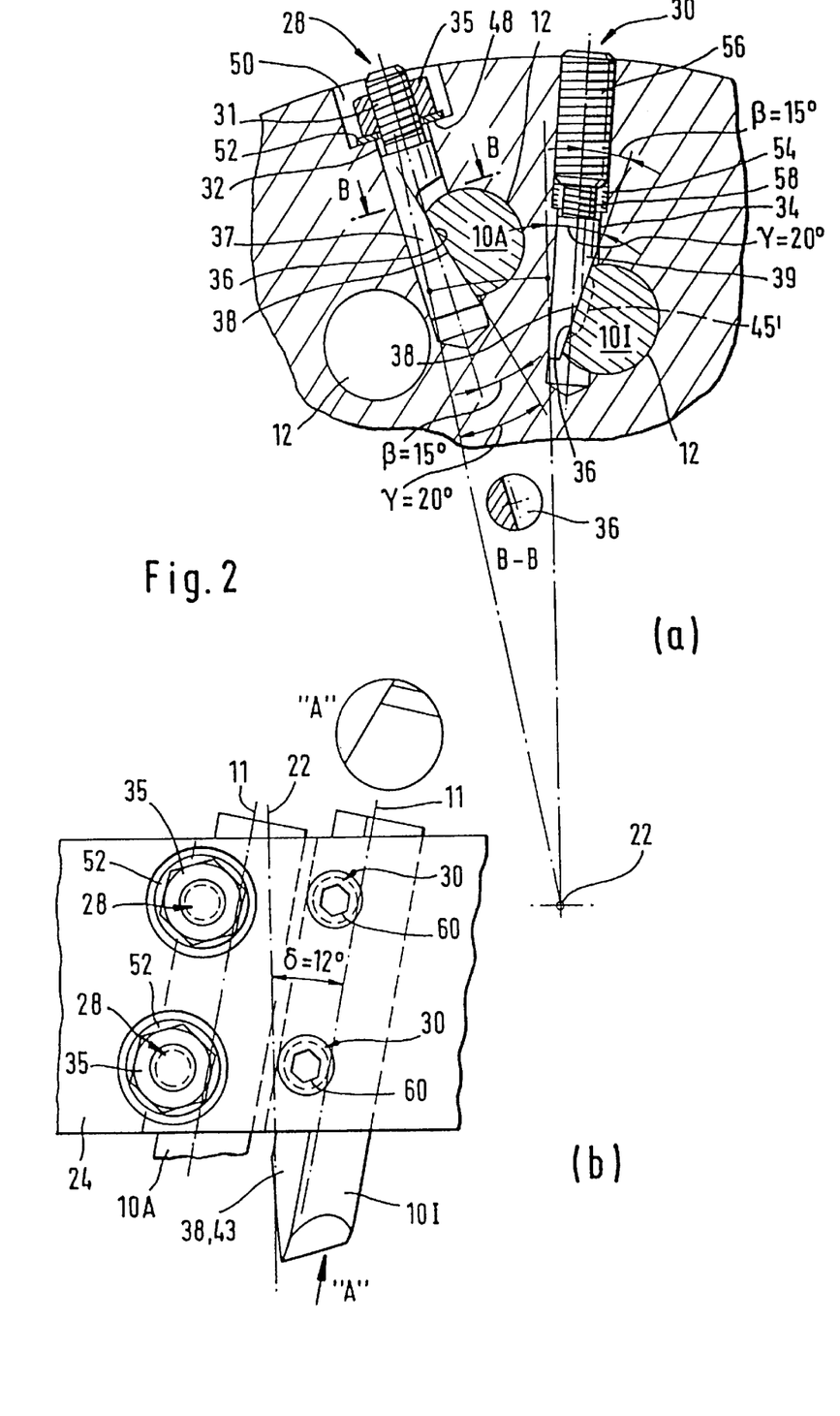

In the preferred embodiment depicted in FIG. 2, the inside cutter 10I and the outside cutter 10A are provided with a thrust wedge 39 and a traction wedge 37 respectively and are disposed in circles of different sizes, so that a greater number of cutting tool groups comprised of one inside and one outside cutter each can be accommodated in the cutter head body 24. It would be possible as already mentioned above to arrange the inside and the outside cutters in the same circle, as shown in FIG. 1, and to use wedging devices equipped only with a traction wedge or only with a thrust wedge for the inside and outside cutters, or, as the inverse of that shown in FIG. 2a, to use a wedging device with a traction wedge for the inside cutter 10I and a wedging device with a thrust wedge for the outside cutter 10A. This is merely a question of practicality and of the space requirement in view of the gear cutting task to be performed.

According to that which is depicted in FIGS. 1 and 2b, the two clamping bores for each cutting tool receiving bore 12 are arranged in the peripheral direction of the cutter head body 24 in offset relation to one another. Each cutting tool receiving bore 12 forms together with the direction of the center axis 22 of the cutter head body 24 an angle of inclination δ corresponding to the offset arrangement of the clamping bores, as already explained above. In FIG. 2b, a plan view "A" of the inside cutter 10I is additionally shown at the upper right. In FIG. 2a, a cross-sectional view of the traction wedge at the line B—B is additionally shown at the lower left. In FIG. 2b merely the positioning surface 38 and the cutting face 43 which lie in a common plane are shown, so that the positioning surface forms the cutting face and vice versa. The secondary cutting face 45 is not shown in FIG. 2b. It is suggested at 45' in FIG. 2a, as already mentioned above.

For fitting and setting up the cutter head 8 the wedging devices 28 are inserted with their traction wedges 37 passing transversely through the cutting tool receiving bores 12 and beyond into the clamping bore 32. Then the outside cutters 10A are inserted into the cutting tool receiving bores 12, and finally the outside cutters 10A are fixed in the cutting tool receiving bores 12 by tightening the nut 35 by means of a socket wrench. The inside cutters 10I can be set into the cutting tool receiving bores 12 prior to the insertion of the wedging devices 30. The wedging devices 30, which may have been already partially inserted into the clamping bores 34 beforehand, are now urged with the clamping surfaces 36 of their thrust wedges 39 against the positioning surfaces 38 of the inside cutters 10I, in that the headless screws 56 are screwed into the clamping bores 34 in the manner described above. The thrust wedges 39 are further driven into the clamping bores 30 with amplified force due to the opposing thread pitch of the two threaded connections. In this way the inside cutters 10I are fixed in the cutting tool receiving bores 12.

We claim:

1. A round bar cutting tool for gear cutting and finishing operations, comprising a cutting end (40) having at least two clearance faces (41, 42) and at least one cutting face (43), the cutting end being located on a shank (44) having a longitudinal axis and a generally round cross-sectional configuration adapted for clamping in a cutting tool receiving bore (12) of a cutter head (8) by clamping means (28, 30), and a substantially planar positioning surface (38) being located along the length of the shank in an extension of the cutting face (43), parallel to the longitudinal axis of the cutting tool, serving as an engagement surface for the clamping means (28, 30), wherein the cutting face (43) and the positioning surface (38) lie in the same plane parallel to the longitudinal axis (11).

2. The round bar cutting tool according to claim 1, wherein the positioning surface (38) is arranged so that a desired rake angle (α) is formed in a cross-sectional direction of the shank.

3. The round bar cutting tool according to claim 2, wherein the cutting tool includes one of an inside cutter configuration and an outside cutter configuration, and the cutting face (43) of the inside cutter configuration is a mirror-image of the outside cutter configuration.

4. The round bar cutting tool according to claim 2, wherein the cutting face (43) has a coating that increases the serviceable life of the cutting tool.

5. The round bar cutting tool according to claim 1, wherein at least one secondary cutting face (45) is located in or adjacent to the cutting face (43).

6. A combination of at least one round bar cutting tool and a cutter head comprising a substantially disk-shaped cutter head body (24) having a thickness and an outer periphery, and being rotatable around a center axis (22), at least one cutting tool receiving bore (12) extending into the cutter head body substantially in a direction of thickness of the cutter head body and adapted to accommodate a round bar cutting tool (10), at least one clamping bore (32, 34) extending into the cutter head body (24), said clamping bore (32, 34) penetrating the cutter head body (24) from the outer periphery in a substantially radial direction perpendicular to and intersecting the cutting tool receiving bore (12), clamping means (28, 30) located in the clamping bore for clamping a round bar cutting tool in the cutting tool receiving bore, the clamping means having at least one wedging device (28, 30) with a clamping surface (36) arranged at a specific wedge angle (β) and capable of being urged against a positioning surface (38) of the round bar cutting tool (10) to clamp the round bar cutting tool in the cutting tool bore (12); and     at least one round bar cutting tool having a cutting end (40) with at least two clearance faces (41, 42) and at least one cutting face (43), the cutting end being located on a shank (44) having a longitudinal axis and a general round cross-sectional configuration adapted for clamping in the cutting tool receiving bore(12) of the cutter head (8) by the clamping means (28, 30), and a substantially planar positioning surface (38) serving as an engagement surface for the clamping means (28, 30) being located along the length of the shank in an extension of the cutting face (43), parallel to the longitudinal axis of the cutting tool.

7. The combination according to claim 6, wherein a pair of parallel clamping bores (32, 34) intersect each cutting tool receiving bore (12), the pair of parallel clamping bores (32, 34) being in superposed relation to one another in a direction of the center axis of the cutter head (24), and each bore of the pair of parallel clamping bores (32, 34) contains an identical wedging device (28, 30).

8. A combination of at least one round bar cutting tool and a cutter head comprising a substantially disk-shaped cutter head body (24) having a thickness and an outer periphery, and being rotatable around a center axis (22), at least one cutting tool receiving bore (12) extending into the cutter head body substantially in a direction of the thickness of the cutter head body and adapted to accommodate a round bar cutting tool (10), at least one pair of parallel clamping bores (32, 34) extending into the cutter head body (24), said clamping bores (32, 34) penetrating the cutter head body (24) from the outer periphery in a substantially radial direction perpendicular to and intersecting the cutting tool receiving bore (12), clamping means (28, 30) located in each of the pair of parallel clamping bores for clamping a round bar cutting tool in the cutting tool receiving bore, the clamping means having at least one wedging device (28, 30) with a clamping surface (36) arranged at a specific wedge angle (β) and capable of being urged against a positioning surface (38) of the round bar cutting tool (10) to clamp the round bar cutting tool in the cutting tool bore (12); and     at least one round bar cutting tool having a cutting end (40) with at least two clearance faces (41, 42) and at least one cutting face (43), the cutting end being located on a shank (44) having a longitudinal axis and a generally round cross-sectional configuration adapted for clamping in the cutting tool receiving bore(12) of the cutter head (8) by the clamping means (28, 30), and a substantially planar positioning surface (38) serving as an engagement surface for the clamping means (28, 30) being located along the length of the shank in an extension of the cutting face (43), parallel to the longitudinal axis of the cutting tool, wherein the pair of parallel clamping bores (32, 34) are in superposed relation to one another in a direction of the center axis of the cutter head (24), and each of the pair of parallel clamping bores (32, 34) contain an identical wedging device (28, 30), and wherein at least two round bar cutting tools (10) are located in two cutting tool receiving bores, the two round bar cutting tools being outside and inside cutters (10A, 10I) respectively, the cutting tool receiving bores (12) for the two round bar cutting tools (10) being positioned at different radial distances from the center axis (22) of the cutter head body (24), each wedging device (28) associated with one of the two round bar cutting tools (10) has a traction wedge (37) with a wedge angle (β) tapering towards the outer periphery of the cutter head body (24), and each wedging device (30) of the other round bar cutting tool (10) has a thrust wedge (39) with a wedge angle (β) tapering toward the center axis (22) of the cutter head body (24).

9. The combination according to claim 8, wherein the traction wedge (37) is provided with a threaded shank (31) at its radially outer end on which a nut (35) is located, the periphery of the cutter head body (24) including a shoulder (48) surrounding the clamping bore (32) against which the nut (35) is adapted to bear.

10. The combination according to claim 8, wherein the clamping bore (34) associated with the thrust wedge (39) is provided with a female thread (54) in a radially outer area and receives a threaded pin (56) rotatably connected at its radially inner end to the thrust wedge (39).

11. The combination according to claim 10, wherein the rotatable connection between the threaded pin (56) and the thrust wedge (39) is a threaded connection.

12. The combination according to claim 11, wherein the threaded connection between the thrust wedge (39) and the threaded pin (56) has a different pitch direction than the threaded connection between the threaded pin (56) and the female thread (54).

13. The combination according to claim 10, wherein the rotatable connection between the threaded pin (56) and the thrust wedge (39) has a hinge-like design.

14. The combination according to claim 7, wherein the wedging devices (28, 30) associated with both round bar cutting tools have the same wedge angles (β).

15. The combination according to claim 6, wherein round bar cutting tools (10) to be accommodated in the at least one cutting tool receiving bore (12) are provided with a wedge angle (β) that may be varied in steps.

16. The combination according to claim 7, wherein the clamping bores (32, 34) are each oriented at a positioning angle which positions the clamping surface (36) of each of the wedging devices (28, 30) within the cutter head body (24).

17. The combination according to claim 7, wherein the two clamping bores (32, 34) of each cutting tool receiving bore (12) are in offset relationship to one another in a peripheral direction of the cutter head (24).

18. The combination according to claim 17, wherein each cutting tool receiving bore (12) is arranged at an angle of inclination (δ) with respect to a direction of the center axis (22) of the cutter head body (24) in the peripheral direction of the cutter head body (24), corresponding to the offset of the clamping bores (32, 34).

19. A cutter head comprising a substantially disk-shaped cutter head body (24) having a thickness and an outer periphery, and being rotatable around a center axis (22), at least one cutting tool receiving bore (12) extending into the cutter head body substantially in a direction of the thickness of the cutter head body and adapted to accommodate a round bar cutting tool (10), at least one pair of parallel clamping bores (32, 34) extending into the cutter head body (24), said clamping bores (32, 34) penetrating the cutter head body (24) from the outer periphery in a substantially radial direction perpendicular to and intersecting the cutting tool receiving bore (12), clamping means (28, 30) located in the clamping bores for clamping a round bar cutting tool in the cutting tool receiving bore, the clamping means having at least one wedging device (28, 30) with a clamping surface (36) arranged at a specific wedge angle (β) and capable of being urged against a positioning surface (38) of the round bar cutting tool (10) to clamp the round bar cutting tool in the cutting tool bore (12), the pair of parallel clamping bores (32, 34) being in superposed relation to one another in a direction of the center axis of the cutter head (24), and each bore of the pair of parallel clamping bores (32, 34) contains an identical-wedging device (28, 30).

20. The combination according to claim 19, wherein the wedging devices (28, 30) associated with both round bar cutting tools have the same wedge angles (β).

21. The combination according to claim 19, wherein the clamping bores (32, 34) are each oriented so that a positioning angle is formed that positions the clamping surface (36) of each of the wedging devices (28, 30) within the cutter head body (24).

22. The combination according to claim 19, wherein the two clamping bores (32, 34) of each cutting tool receiving bore (12) are in offset relationship to one another in a peripheral direction of the cutter head (24).

23. The combination according to claim 19, wherein each cutting tool receiving bore (12) is arranged at an angle of inclination (δ) with respect to the center axis (22) of the cutter head body (24) in the peripheral direction of the cutter head body (24), corresponding to the offset of the clamping bores (32, 34).

* * * * *